US012649073B2

(12) United States Patent
Hetrich et al.

(10) Patent No.: US 12,649,073 B2
(45) Date of Patent: Jun. 9, 2026

(54) SYSTEMS AND METHODS FOR PROVIDING A CONSOLIDATED PFL OR SRL DRUM

(71) Applicant: MSA Technology, LLC, Cranberry Township, PA (US)

(72) Inventors: Mitchell H. Hetrich, Greenville, PA (US); Michael D. Monahan, Cranberry Township, PA (US); Bryan Kroh, Harmony, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 893 days.

(21) Appl. No.: 17/710,365

(22) Filed: Mar. 31, 2022

(65) Prior Publication Data

US 2023/0310910 A1 Oct. 5, 2023

(51) Int. Cl.
*A62B 35/00* (2006.01)

(52) U.S. Cl.
CPC ................................ *A62B 35/0093* (2013.01)

(58) Field of Classification Search
CPC . A62B 35/0093; A62B 35/04; A62B 35/0043; A63B 1/06; A63B 1/08; A63B 1/10; A63B 1/16; A63B 1/18; F16D 59/00
USPC .......................................................... 182/231
See application file for complete search history.

(56) References Cited

U.S. PATENT DOCUMENTS 4,228,970 A 10/1980 Morinaga
5,031,962 A 7/1991 Lee
5,447,280 A * 9/1995 Feathers ............ A62B 35/0093 242/396.6
2008/0041661 A1 * 2/2008 Meillet .............. A62B 35/0056 182/13
2009/0078505 A1 * 3/2009 Casebolt ............ A62B 35/0093 254/266
2009/0211848 A1 * 8/2009 Parker ....................... A62B 1/10 182/231
2010/0224448 A1 * 9/2010 Wolner ..................... A62B 1/10 182/234
2010/0226748 A1 * 9/2010 Wolner .............. A62B 35/0093 414/815
2010/0308149 A1 * 12/2010 Allington ................ F16D 59/00 242/379
2011/0084158 A1 4/2011 Meillet et al.
2011/0100766 A1 * 5/2011 Auston .............. A62B 35/0093 188/65.1

(Continued)

FOREIGN PATENT DOCUMENTS

GB 2543366 A 4/2017
WO WO-2019012454 A1 * 1/2019 ......... A62B 35/0093
WO 2022/009175 1/2022

OTHER PUBLICATIONS

Patent Cooperation Treaty, PCT/US2023/065125, International Search Report, Oct. 6, 2023.

(Continued)

*Primary Examiner* — Kyle J. Walraed-Sullivan
(74) *Attorney, Agent, or Firm* — Jones Day

(57) ABSTRACT

Systems and methods are provided for a fall limiting device. An embodiment includes a housing and a rotatable drum comprising an axle and two side portions, said rotatable drum comprising a single contiguous material piece. A retractable member is held, at least in part, within the housing via winding around the rotatable drum within the two side portions.

24 Claims, 8 Drawing Sheets

(56) References Cited

U.S. PATENT DOCUMENTS

| | | | | |
|---|---|---|---|---|
| 2011/0315481 | A1* | 12/2011 | Griffiths | A62B 1/08 188/110 |
| 2012/0298451 | A1* | 11/2012 | Griffiths | A62B 1/10 188/134 |
| 2018/0185679 | A1 | 7/2018 | Bornack | |
| 2020/0023211 | A1* | 1/2020 | Chang | A62B 1/10 |
| 2021/0077840 | A1* | 3/2021 | Boraas | A62B 35/0093 |
| 2022/0105374 | A1* | 4/2022 | Jacob | B65H 75/4442 |
| 2022/0305308 | A1* | 9/2022 | Kroh | B65H 75/4447 |
| 2023/0241423 | A1* | 8/2023 | Schrank | F16D 59/00 182/239 |
| 2023/0271038 | A1* | 8/2023 | Schrank | A62B 35/0093 182/232 |
| 2023/0271039 | A1* | 8/2023 | Shrank | A62B 35/0093 182/232 |

OTHER PUBLICATIONS

European Patent Office, Appl. 23782046.9, Extended European Search Report, Mar. 16, 2026.

* cited by examiner

SYSTEMS AND METHODS FOR PROVIDING A CONSOLIDATED PFL OR SRL DRUM

BACKGROUND

Fall prevention and mitigation devices (e.g., self-retracting devices, personal fall limiters (PFLs), Self-Retracting Lanyards (SRLs)) may be used in a variety of situations and applications. For example, a retractable lanyard is commonly used for fall protection in industrial environments, as well as in connection with recreational activities. Such devices have numerous end uses, including, but not limited to, construction, manufacturing, hazardous materials/remediation, asbestos abatement, spray painting, sand blasting, welding, mining, numerous oil and gas industry applications, electric and utility, nuclear energy, paper and pulp, sanding, grinding, stage rigging, roofing, scaffolding, telecommunications, automotive repair and assembly, warehousing, and railroading.

SUMMARY

Systems and methods are provided for a fall limiting device. An embodiment includes a housing and a rotatable drum comprising an axle and two side portions, said rotatable drum comprising a single contiguous material piece. A retractable member is held, at least in part, within the housing via winding around the rotatable drum within the two side portions.

In another example, a method of assembling a device includes providing a rotatable drum comprising an axle and two side portions, said rotatable drum comprising an axle having (i) exterior portions, one exterior portion extending from an outside surface of each side portion, and (ii) a central portion having an opening that provides a path through an interior of the drum across a diameter of the drum. A portion of a retractable member is passed through the central portion of the axle. A pin is attached to the portion of the retractable member, the pin and the portion of the retractable member are secured in the central portion by pulling on a second portion of the retractable member, and the second portion of the retractable member is wound around the rotatable drum.

DETAILED DESCRIPTION

Fall prevention devices frequently include a housing that includes a rotatable drum or a hub around which a line, typically made of webbing, cable, rope, and/or synthetic material, is wound. The hub rotates to unwind (or "pay out") the line from its housing when a certain level of tension is purposefully applied. When tension is reduced or released, the hub can slowly rotate in a reverse direction via a retraction mechanism, causing the line to retract or rewind about the drum or hub. The retraction mechanism may include a power spring which is energized when the line is paid out from the housing and is de-energized to retract the line into the housing. Certain fall prevention devices may further include a braking mechanism (e.g., a locking mechanism, a mechanism that resists, slows, or arrests unwinding) or assembly for resisting hub rotation when a line unwinds too rapidly, i.e., faster than its predetermined maximum velocity for normal payout. A sudden line payout may be an indication that the lanyard wearer/user has experienced a fall that needs to be stopped or arrested.

The drum of a fall prevention device rotates around an axle positioned at a center of rotation of the drum. The axle may be made of metal and may be keyed with one or more components of the device. An axle may have complex geometries that require expensive and time-consuming manufacturing and assembly steps. Systems and methods as described herein provide, in embodiments, an improved fall prevention device that may utilize fewer components. In some embodiments, the systems and methods described herein may provide for easier manufacture and assembly of a fall prevention device, limiting opportunities for the introduction of defects and errors, thus providing for enhanced safety of the device.

Figure 1:
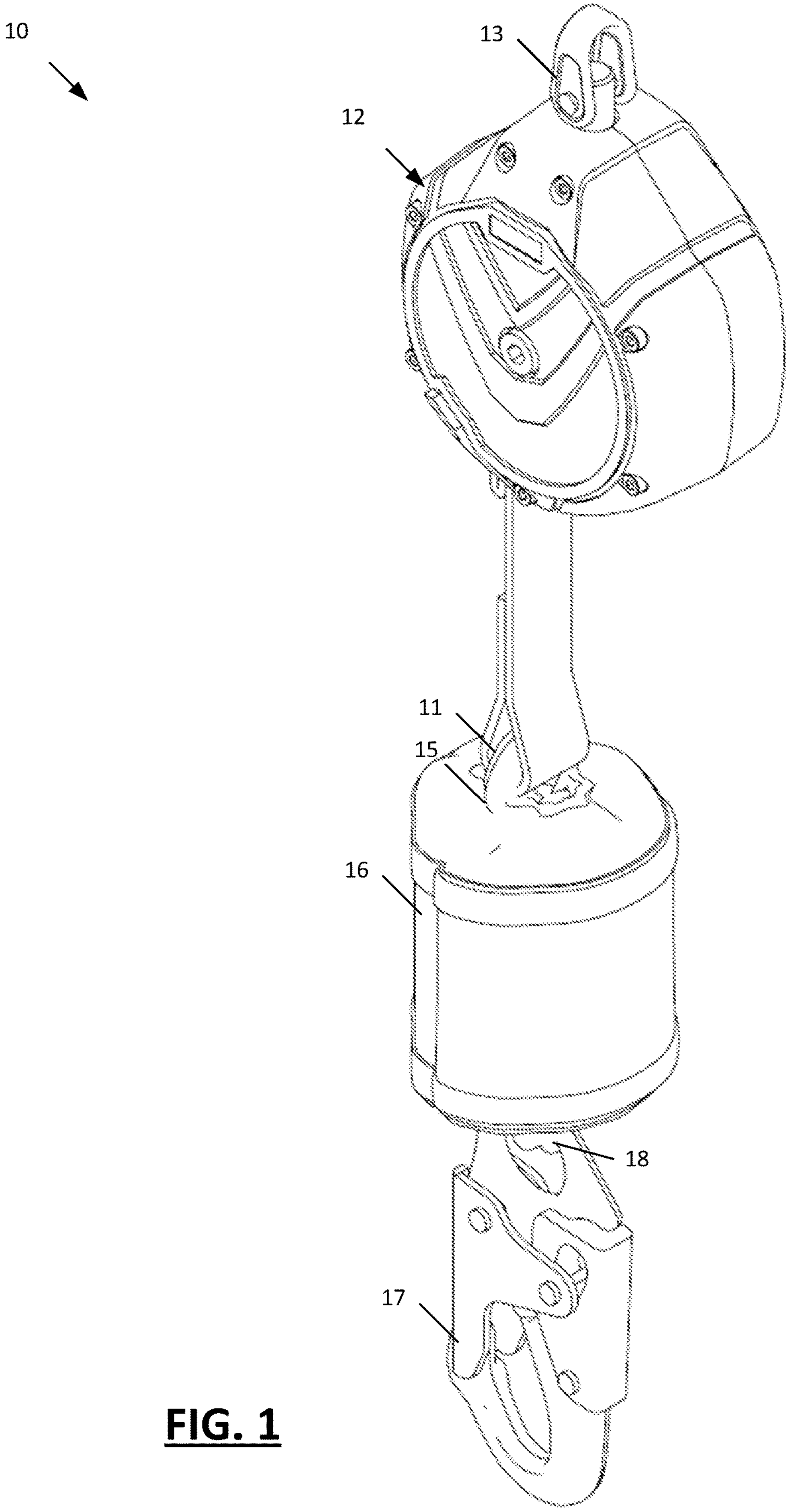
FIG. 1 is a diagram depicting an example fall limiting device.

FIG. 1 is a diagram depicting an example fall limiting device in the form of a self-retracting device 10 (e.g., for use in industrial environments and recreational activities). The self-retracting device 10 can be implemented in any appropriate application or environment where a user or worker engages in activities in an elevated position and requires some protection in the event of a fall. Further, in some non-limiting embodiments or aspects, the self-retracting device 10 is in the form of a fall protection device or lanyard, such as a self-retracting lanyard. The self-retracting device 10 is configured to protect the user should an unintentional, accidental fall commence. The self-retracting device 10 is configured to prevent the user from falling too far or stopping too quickly.

With continued reference to FIG. 1, the self-retracting device 10 has a housing 12 that encloses various components configured for paying out a line 11 from the housing 12 and retracting the line 11 into the housing. The housing 12 has a connector 13 for connecting the self-retracting device 10 to a fixed anchor point, such as a floor, wall, railing, or the like. In some non-limiting embodiments or aspects, the connector 13 may be a ring configured for receiving a connection element that is connected to the fixed anchor point. The housing 12 may have a handle (not shown) to facilitate carrying of the self-retracting device 10 while not in use. In some non-limiting embodiments or aspects, the handle may also function as an auxiliary attachment point for connecting the self-retracting device 10 to an anchor point.

With continued reference to FIG. 1, the line 11 may be connected to a first end 15 of an energy absorber 16 configured to deploy in an event of an accidental fall in order to safely arrest the fall of the user. The energy absorber 16 may be self-deployable when the line 11 is exposed to a tension exceeding a predetermined threshold. A hook 17 is connected to a second end 18 of the energy absorber 16. The hook 17 is configured for removably connecting to a safety harness worn by the user. For example, the hook 17 may be removably connectable to a D-ring on a dorsal portion of the safety harness. In another example, hook 17 is connected to a fixed anchor point, while connector 13 is connected to a user's harness. The hook may take a variety of forms, including a carabineer.

Figure 2:
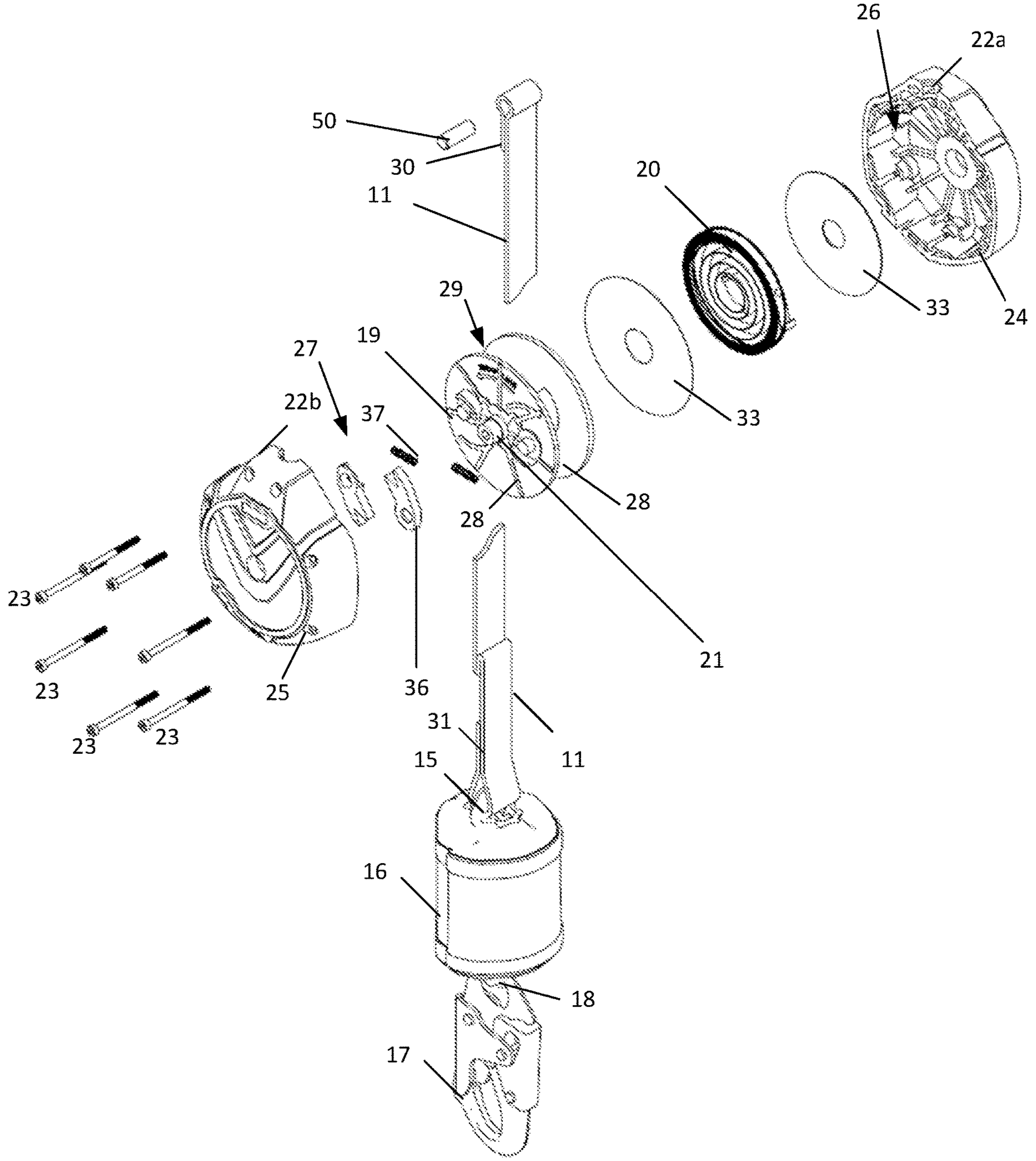
FIG. 2 is a diagram depicting example details of a fall limiting device.

FIG. 2 is a diagram depicting example details of a fall limiting device. The self-retracting device 10 includes a hub 19 having a line 11 configured to be wound thereon. In the example of FIG. 2 and certain embodiments described further herein, the hub 11 is provided in the form of a rotatable drum comprising an axle and two side portions that are made from a single contiguous material piece. For example, the hub 19 may be formed from a single piece of aluminum, such as a single die cast aluminum piece. In certain embodiments, the hub 19 may be formed of other materials, such as steel or plastic. The hub 19 may be formed using other manufacturing techniques including but not limited to 3D-printing, machining, sand casting, and injection molding. The hub 19 depicted in FIG. 2 may include, in a single piece, features that could be implemented using a variety of disparate pieces (e.g., a separate axle piece), such that the single material piece provides a lesser part count, simpler assembly, and improved safety via less opportunity for erroneous configuration.

The self-retracting device 10 further includes a retraction member 20 (e.g., a retraction spring) biasing the hub 19 in a first rotational direction of the hub 19, and an axle 21 that is integral to the hub 19 about which the hub 19 and the retraction member 20 rotate. The hub 19 is configured to (i) retract the line 11 when the hub 19 moves in the first rotational direction and (ii) payout the line 11 when the hub 19 moves in a second rotational direction opposite to the first rotational direction. In some non-limiting embodiments or aspects, the first rotational direction may be a counter-clockwise direction about a longitudinal axis of the axle 21, and the second rotational direction may be a clockwise direction about the axle 21. In further non-limiting embodiments or aspects, the first rotational direction may be a clockwise direction about the axle 21, and the second rotational direction may be a counter-clockwise direction about the axle 21.

With continued reference to FIG. 2, the self-retracting device 10 includes a housing assembly having a first housing cover 22*a* and a second housing cover 22*b*. The first and second housing covers 22*a*, 22*b* define the housing 12 (shown in FIG. 1). In some non-limiting embodiments or aspects, the first housing cover 22*a* and the second housing cover 22*b* may be removably connectable to each other. In some non-limiting embodiments or aspects, one or more fasteners 23 may be provided for removably connecting the first housing cover 22*a* to the second housing cover 22*b*. The one or more fasteners 23 may be disposed about an outer perimeter of the housing assembly 22. Each of the one or more fasteners 23 may be configured to threadably engage a threaded hole 24 in one of the first housing cover 22*a* and the second housing cover 22*b* and extend through a through hole 25 on the other of the first housing cover 22*a* and the second housing cover 22*b*. In some embodiments or aspects, the first housing cover 22*a* and the second housing cover 22*b* may be removably connectable to each other by way of clips, adhesive, fasteners, or any combination thereof.

With continued reference to FIG. 2, the housing assembly 22 defines an interior cavity 26 that receives the components of the self-retracting device 10. For example, the interior cavity 26 may be defined between the first housing cover 22*a* and the second housing cover 22*b*. In some non-limiting embodiments or aspects, the interior cavity 26 of the housing assembly 22 is configured to receive the hub 19 and axle 21, a lock assembly 27, and the retraction member 20. The axle 21 may be at least partially supported by the housing assembly 22 and extends between the first and second housing covers 22*a*, 22*b*.

As shown in FIG. 2, the hub 19 has a body comprising two side portions 28 defining a recessed portion 29 that receives the line 11. The line 11 is wound about the recessed portion 29 and includes a first end 30 attached to the hub 19 and a second, free end 31 positioned opposite the first end 30. In an embodiment, the first end is attached to a pin 50 that aids in securing the line 11 to the hub 19, as described further herein. In an embodiment, a first portion of the line associated with the first end 30 is wrapped around the pin 50 and then affixed to itself (e.g., via stitching, adhesive, or a retention structure such as a clip or ring). The pin 50 and first portion of the line 30 are then secured to the hub 19 as described further below. The second end 31 of the line 11 is configured for connecting to the first end 15 of the energy absorber 16. The hub 19 is rotatable within the housing assembly 22 and is configured to pay out or retract the line 11 from and into the housing assembly 22 as the hub 19 is rotated within the housing assembly 22 about the longitudinal axis of the axle 21.

With continued reference to FIG. 2, the retraction member 20 is received within the interior cavity 26 of the housing assembly 22 and is configured to bias the hub 19 in the first rotational direction. In some non-limiting embodiments or aspects, the retraction member 20 is positioned between the hub 19 and the first housing cover 22*a*. One or more noise reducer pads 33 may be positioned between the hub 19, the retraction member 20, and the first housing cover 22*a* to absorb noise and vibration that may otherwise be caused due to contact between those components. The retraction member 20 is configured to (i) retract the line 11 when the hub 19 moves in the first rotational direction due to release of potential energy stored in the retraction member 20 and (ii) pay out the line 11 when the hub 19 moves in the second rotational direction opposite to the first rotational direction due to an outside force. Movement of the hub 19 in the second rotational direction builds potential energy in the retraction member 20. This potential energy may be released when the outside force is removed in order to retract the line 11 into the housing assembly 22 by winding the line 11 on the hub 19. In some non-limiting embodiments or aspects, the retraction member 20 may be a power spring having a first end fixed relative to the housing assembly 22, such as the first housing cover 22*a*, and a second end secured directly or indirectly to the rotatable hub 19. In this manner, rotation of the hub 19 in the second direction during payout of the line 11 from the housing assembly 22 builds potential energy in the power spring which is then used to rotate the hub 19 in the first direction to retract the line 11 into the housing assembly 22 when tension on the line 11 is unloaded.

With further reference to FIG. 2, the self-retracting device 10 may have the lock assembly 27 that is configured to prevent rotation of the hub 19 upon activation of the lock assembly 27. The lock assembly 27 is disposed in the interior cavity 26 of the housing assembly 22 and includes a speed-sensitive mechanism 36 having an activated position and a non-activated position. The speed-sensitive mechanism 36 is connected to the hub 19 and is rotatable with the hub 19. In some non-limiting embodiments or aspects, the speed-sensitive mechanism 36 of the lock assembly 27 may include one or more pawls that are biased to a first position by a biasing member 37, such as a spring.

The speed-sensitive mechanism 36 is configured to transition from the non-activated position to the activated position at a predetermined rotational speed of the hub 19. The predetermined rotational speed of the hub 19 at which the speed-sensitive mechanism 36 is transitioned from the non-activated position to the activation position is selected to correspond to a rotational speed that would be indicative of a fall event. As the line 11 is paid out from the hub 19, the hub 19 and speed-sensitive mechanism 36 rotate until the hub 19 and the speed-sensitive mechanism 36 reach the predetermined rotational speed. The biasing force on the one or more pawls of the speed-sensitive mechanism 36 due to the biasing member 37 is overcome by a centripetal force when the rotational speed of the hub 19 exceeds a predetermined threshold, at which the one or more pawls transition to a second position configured for engagement with one or more teeth, protrusions, indents, or lips on the housing assembly 22, such as the second housing portion 22*b*. Upon engagement of the speed-sensitive mechanism 36 with the housing assembly 22, the payout of the line 11 is stopped to arrest further movement of the user that is connected to the line 11.

In an alternative embodiment, the speed sensitive-mechanism 36 may be attached to the housing, a metal frame, or other structure separate from the hub 19. Such embodiments may include a cam or other structure on the hub that moves the speed-sensitive mechanism 36. The hub may further include teeth or other structures, instead of those teeth or other structures being positioned on the housing assembly 22 or other structure within the self-retracting device 10. In certain embodiments, when the hub rotation, and corresponding cam rotation, reaches a predetermined rotational velocity, the speed-sensitive mechanism 36 is thrown off the cam and engages the tooth or other structures on the hub, halting rotation.

Figure 3:
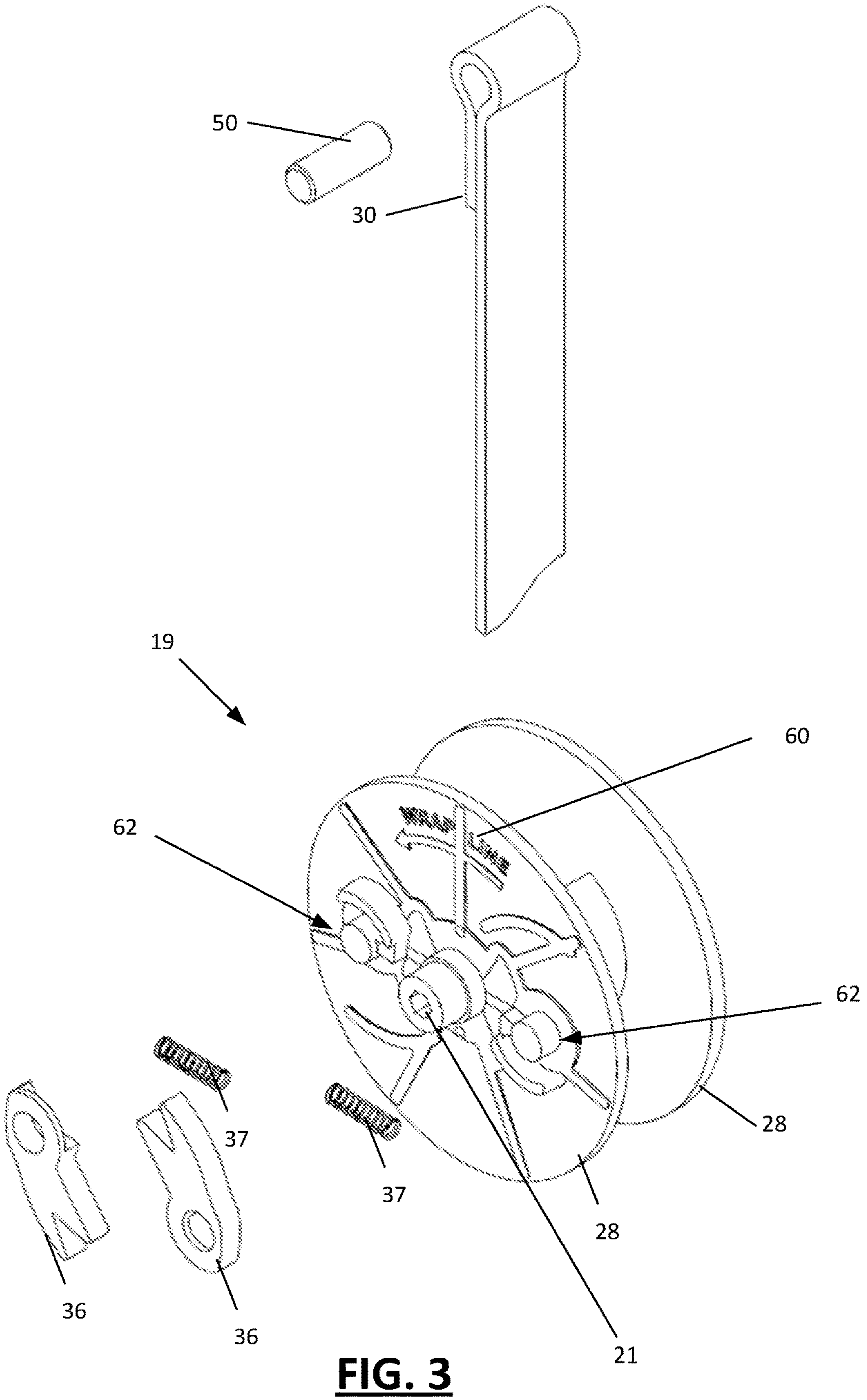
FIG. 3 is a diagram depicting a first view of an example hub in the form of a rotatable drum.

FIG. 3 is a diagram depicting a first view of an example hub in the form of a rotatable drum. The example drum 19 is constructed of a single contiguous material piece, in this case a piece of die cast aluminum, that includes two side portions 28 connected by an axle 21. The axle traverses the width of the hub 19, through both side portions 28. As visible in part in FIG. 3, the axle includes exterior portions, one exterior portion extending from an outside surface of each of the side portions 28. The outside portions of the axle are configured to interact with other components of the fall limiting device (e.g., inner portions of the housing (not shown in FIG. 3)) to facilitate rotation of the hub 19.

FIG. 3 further depicts a retractable member (doubled end portion 30) that is configured to be held, at least in part, within the housing via winding around the rotatable drum 19 within the two side portions 28. To facilitate attachment to the rotatable drum 19, and as discussed further relative to FIGS. 4 and 5, the portion of the retractable member 30 that is held within the housing is wrapped around a pin 50 and affixed to itself (e.g., via stitching, adhesive, a retention clip, a retention ring). As described in further detail in the following figures, the central portion of the axle 21 between the two side portions of the rotatable drum 19 is configured to retain the pin 50 and the portion of the retractable member 30. A substantial portion of the remainder of the retractable member 11 is then wound around the axle 21 between the two side portions 28 when the retractable member 11 is in the retracted position. One or both of the outer portions 28 may include an indicator 60 that illustrates the correct direction for winding the retractable member 11, aiding in proper assembly of the fall limiting device.

FIG. 3 further illustrates an unwinding-speed limit control that takes the form of a pair of pawls biased by springs. As described above with reference to FIG. 2, during normal conditions, the springs 37 are configured to hold the pawls 36 in a retracted position. During an anomaly event, such as a fall, where the rotatable drum 19 rotates in an unwinding direction at more than a threshold rate, centripetal force rotates the pawls 36 outwardly from their retracted position, such that the pawls 36 catch on a feature of another component of the fall limiting device, such as teeth, protrusions, indents, or lips on the inner surface of the housing. As illustrated in FIG. 3 and further shown in FIGS. 6 and 7, the outer surface of at least one of the side portions 28 of the rotatable hub includes one or more structures for retaining the unwinding-speed limit control pawl 36 and spring 37.

Figure 4:
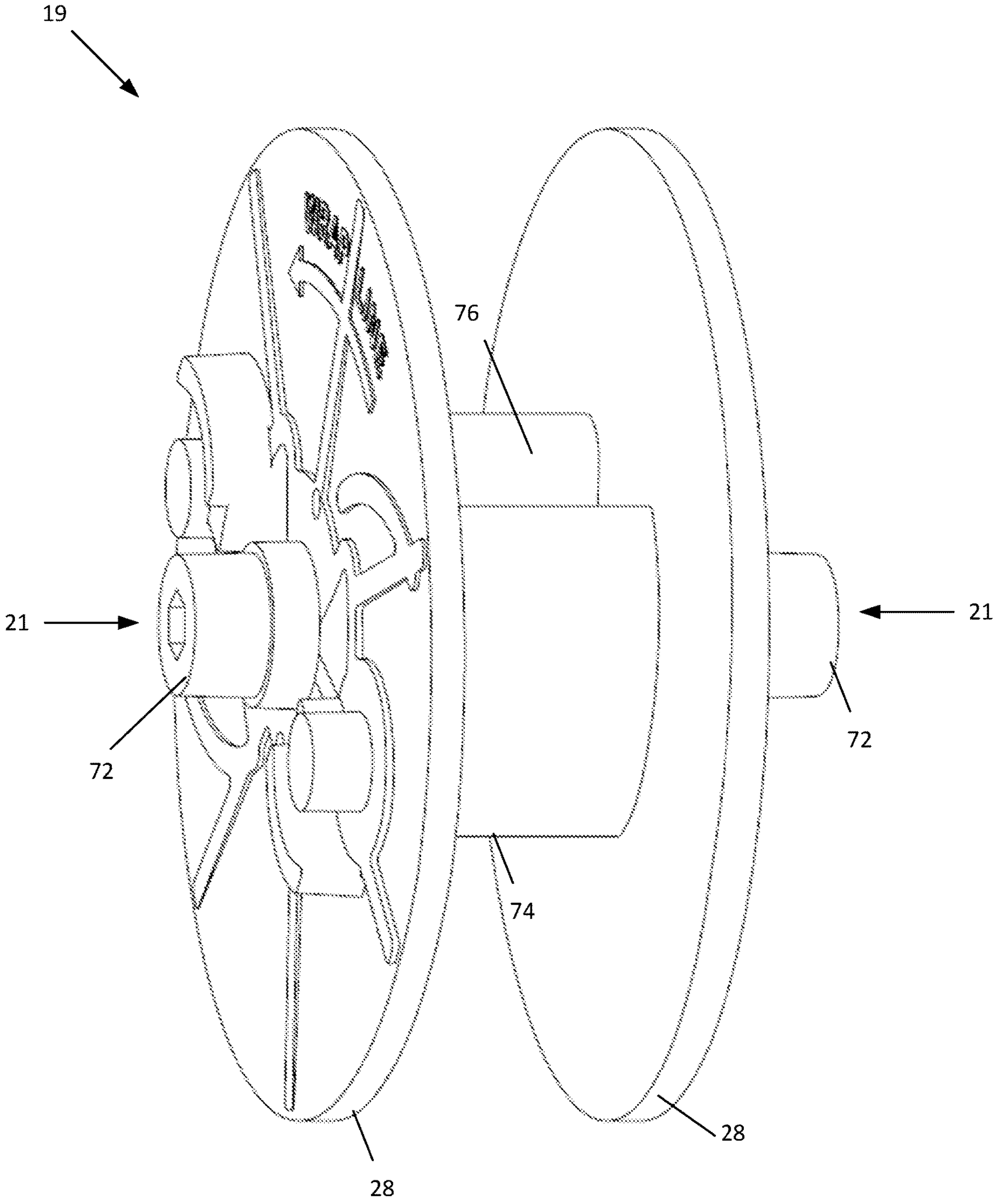
FIG. 4 is a diagram depicting a second view of the rotatable drum that shows an interior portion of the axle.

FIG. 4 is a diagram depicting a second view of the rotatable drum that shows an interior portion of the axle. As discussed above, the rotatable drum 19 includes two side portions 28 and an axle 21 running through and connecting the side portions 28 as one contiguous material piece. The axle 21 includes exterior portions 72, one exterior portion extending from an outside surface of each side portion 28. The axle 21 further includes a central portion 74 that bridges the two side portions 28. In an embodiment, the central portion has an opening 76 that is configured to receive and retain the pin 50 (not shown) and portion of the retractable member 30 (not shown), as illustrated in further detail in FIG. 5. When the pin 50 and portion of the retractable member 30 are retained within the opening 76, the retractable member 11 can then be wound and unwound around the central portion 74 of the axle within the two side portions 28 as desirable to a user of the fall limiting device.

Figure 5:
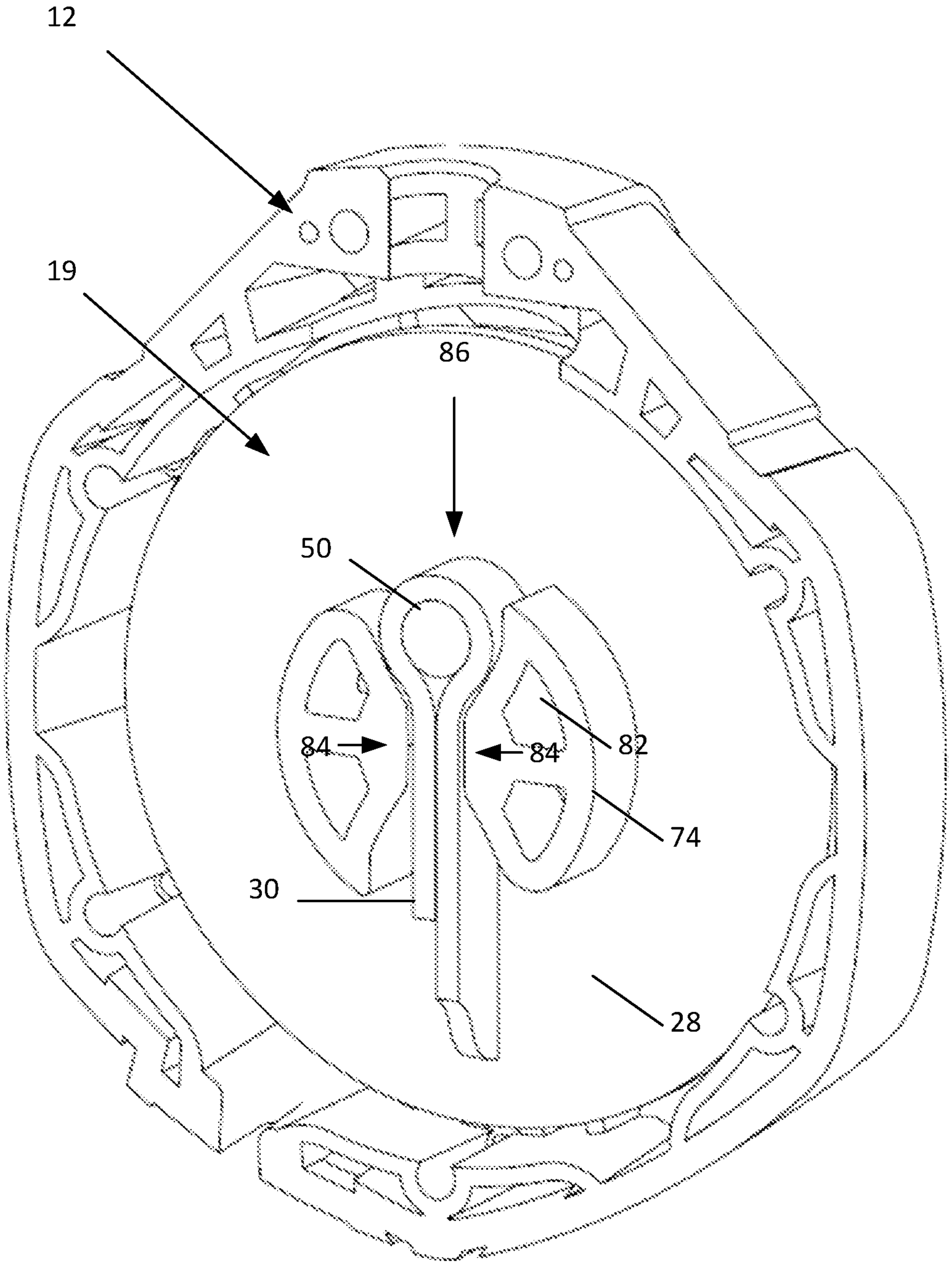
FIG. 5 is a diagram depicting a cutaway view of the rotatable drum and axle with the pin and portion of the retractable member retained therein.

FIG. 5 is a diagram depicting a cutaway view of the rotatable drum and axle with the pin and portion of the retractable member retained therein. FIG. 5 depicts a housing 12 holding a rotatable drum 19 therein, where the interior portion of the rotatable drum 19 is visible in FIG. 5. FIG. 5 illustrates the interior surface of one of the side portions 28 of the rotatable drum as well as a central portion 74 of the axle that traverses the space between the side portions 28, connecting those side portions 28 as a contiguous piece. In the example of FIG. 5, as visible in the cutaway view, the central portion 74 includes voids 82, which may reduce weight of the component, and improve manufacturability and strength. In alternate embodiments, the central portion 74 may be formed without those voids 82.

FIG. 5 further illustrates an hourglass shaped opening 84 within the central portion 74 of the axle that provides a path 86 through the interior of the axle of the rotatable drum across a diameter of the drum. In other embodiments, the central portion may be provided across a chord length of the drum. The end portion of the retractable line 30 and the pin 50 are retained within that central portion, where additional length of the retractable line 11 can be wound around the central portion 74 of the axle and the pin 50 and portion of the retractable line 30 held within the central portion 74. As noted above, the end portion of the retractable line 30 may be secured to the pin 50 or to itself. The doubled portion of the retractable line 30 that is so affixed to itself may be less flexible than the remainder of the retractable line 11. Retention of that portion of the retractable line 30 within the central portion 74 may limit issues with inflexibility of that portion of the retractable line 30 during winding, such as kinks or other winding anomalies.

The pin 50 and portion of the retractable line 30 may be positioned and/or secured in the central portion 74 in a variety of ways. For example, the depicted portion of the retractable line 30 may be passed (e.g., threaded) through the central portion 74, wrapped around the pin 50, and then affixed to itself. The far end of the retractable line 11 (not shown) could then be pulled to position the pin 50 and depicted end of the retractable line 30 within the central portion 74. Alternatively, the depicted portion of the retractable line 30 could be mated with the pin 50 before interaction with the rotatable drum 19. The far end of the retractable line 11 (not shown) could then be passed through the central portion 74 of the axle and pulled until the length of the retractable line 30 traverses the central portion 74, and the depicted portion of the line 30 and the pin are positioned within the central portion 74. Once in position, a second portion of the retractable line 11 (e.g., substantially all of the remainder of the retractable line 11 not within the central portion 74 of the axle) can be wound and unwound around the central portion 74 and the pin 50 and portion of the retractable line 30 secured in the central portion 74.

Figure 6:
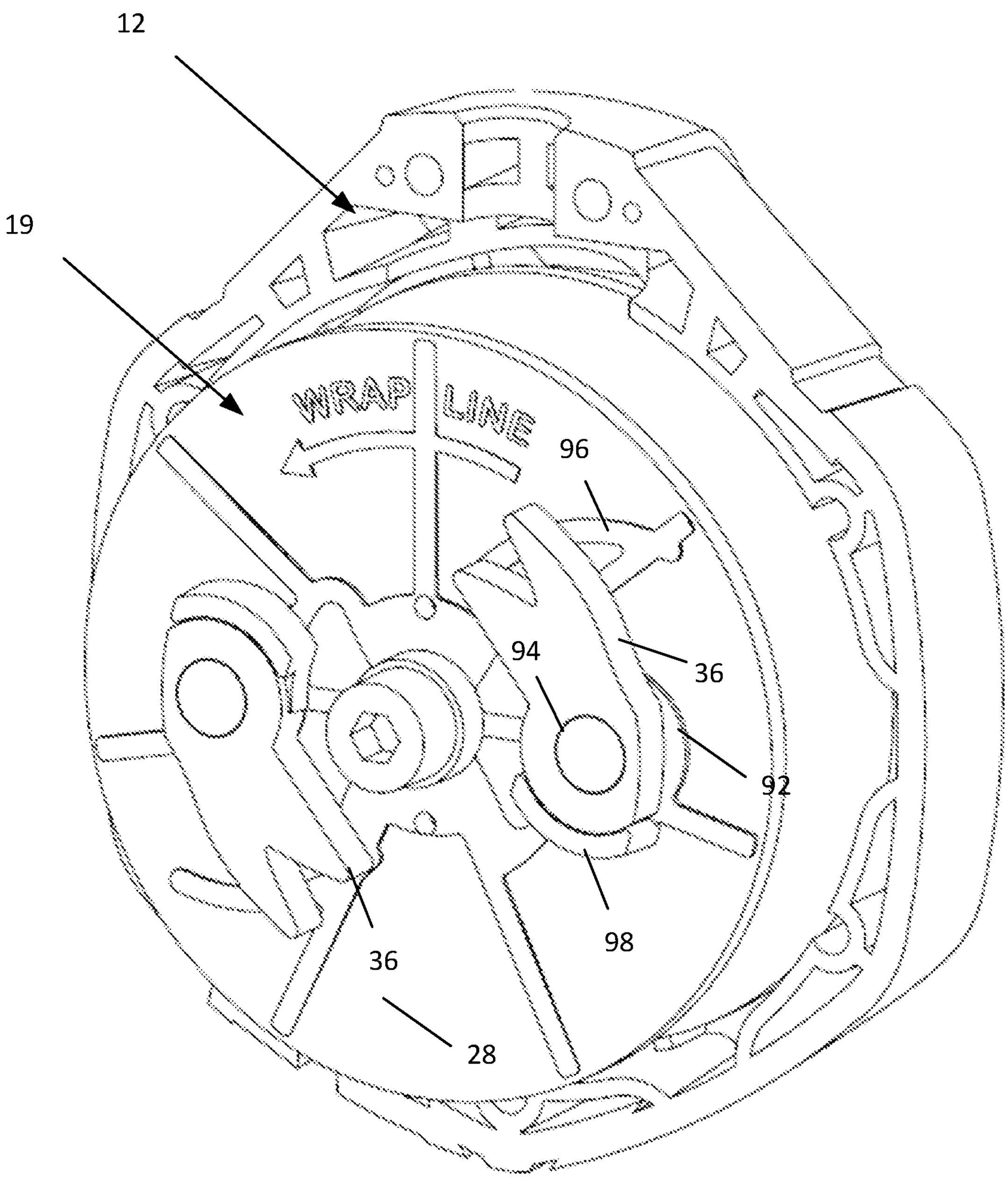
FIG. 6 is a diagram illustrating an unwinding-speed limit control in stowed position attached to a rotatable drum.

FIG. 6 is a diagram illustrating an unwinding-speed limit control in stowed position attached to a rotatable drum. As noted above, the outer surface of one of the side portions 28 of the rotatable drum includes structure for retaining the unwinding-speed limit control, which in the example of FIG. 6 includes a spring-biased pawl 36. In the example of FIG. 6, the structure includes a disc-shaped platform 92 on which the pawl 36 sits and a post 94 about which the pawl 36 rotates. In embodiments, the post 94 may be wider at its outward end to aid in retention of the pawl 36, enabling the pawl 36 to be snapped into place. A first, curved guide rail 96 facilitates rotation of the pawl 36 from its stowed position, shown in FIG. 6, to its deployed position via clockwise rotation, where in the deployed position the teeth of the pawl 36 interact with structure of the housing to arrest deployment of the retractable line 11 from the fall limiting device. The structure for retaining the pawl 36 further includes a second, curved guide structure 98. That structure, in embodiments, may serve multiple purposes. First, that structure 98 may aid in retaining the pawl 36 on the post and may limit counter-clockwise rotation of the pawl 36 to beyond its stowed position. Further, structure 98 may include a structure for interfacing with the spring 37 (not shown). The spring 37 may be positioned between that surface and a surface on the underside of the pawl 36, as illustrated further in FIG. 7, so as to bias the pawl toward the depicted stowed position when subjected to centripetal force less than the counter-force provided by the spring.

Figure 7:
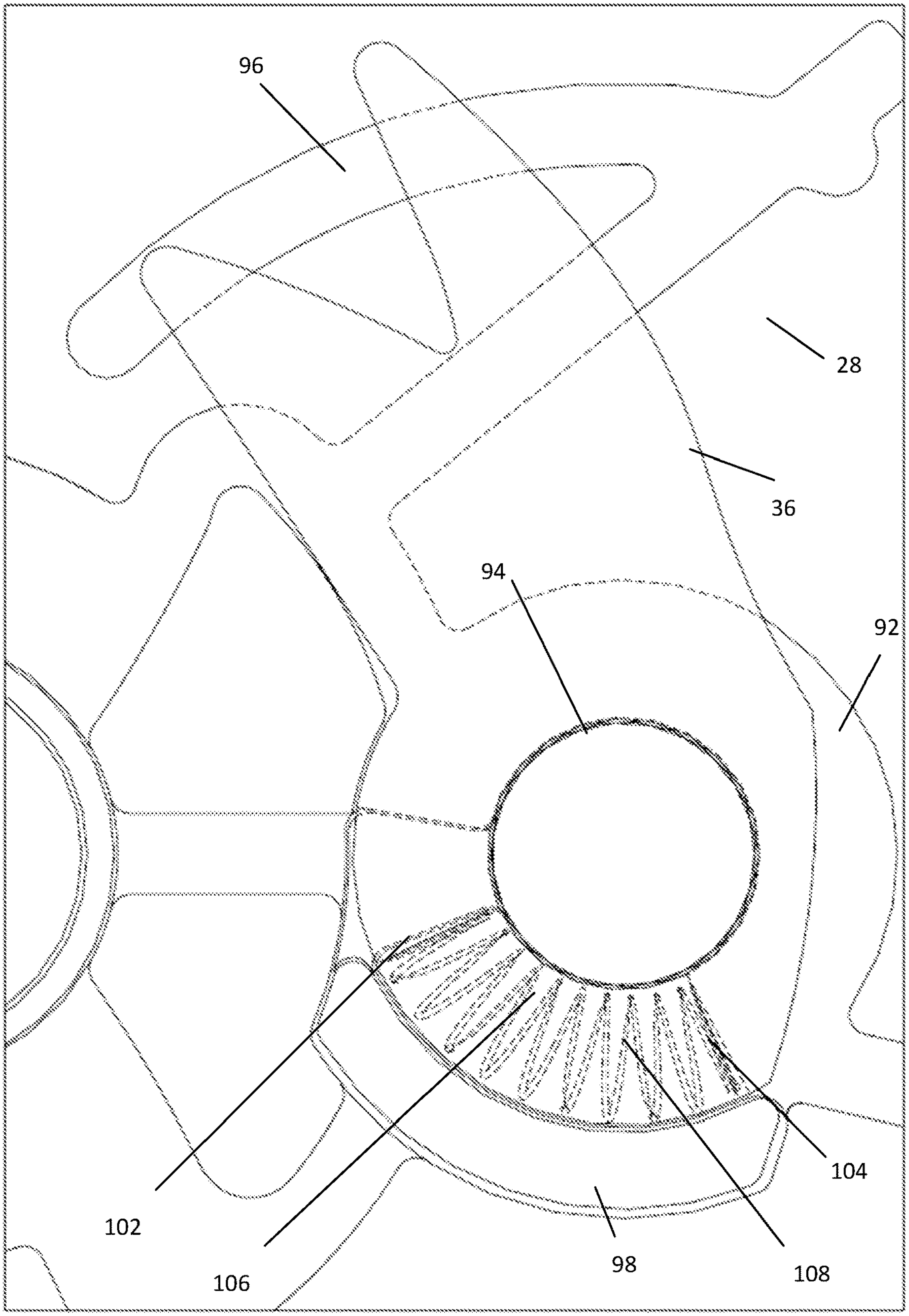
FIG. 7 is a diagram illustrating a position of a pawl-biasing spring in a fall limiting device.

FIG. 7 is a diagram illustrating a position of a pawl-biasing spring in a fall limiting device. FIG. 7 again shows structure for retaining a pawl unwinding-speed limit control on an outer surface of a side portion 28 of a rotatable drum. The example again depicts the disc-shaped platform structure 92 and the post 94 onto which the pawl 36 is placed, as well as the first curved guide rail 96 that supports the pawl 36 as it rotates during deployment. The second, curved guide structure 98 is also depicted. The pawl 36 is depicted in a see-through fashion, where surfaces thereunder are visible. Specifically, the second guide structure 98 includes a first wall structure 102 that runs substantially perpendicular to the curved portion of the structure 98 toward the center of the post 94. Further, the underside of the pawl 36 includes a second wall surface 104 that also runs toward the center of the post. When the pawl is placed onto the post 94, a void 106 is formed by a volume bounded by the outer surface of the side portion 28 of the drum, the post 94, the curved portion of structure 98, the first wall surface 102, and the second wall surface 104. The in-position spring 108 (also illustrated as 37 in certain prior figures) is positioned within the void 106 such that it exerts a force on the first wall surface 102 and the second wall surface 104, biasing the second wall surface 104, and the pawl 36 integral thereto, in a counter-clockwise direction toward the stowed position.

Figure 8:
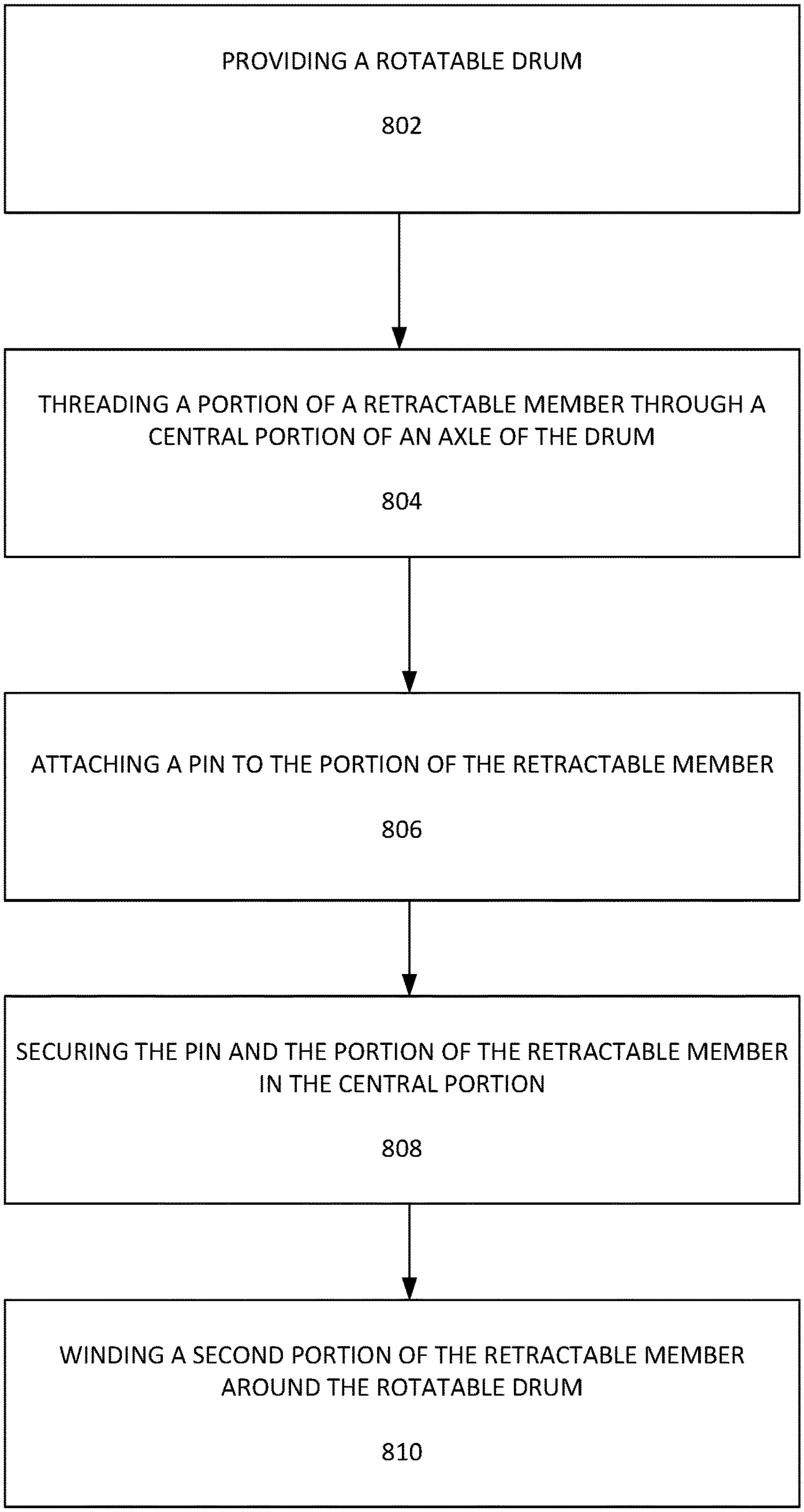
FIG. 8 is a flow diagram depicting a method of assembling a device.

FIG. 8 is a flow diagram depicting a method of assembling a device. At 802, the method includes providing a rotatable drum comprising an axle and two side portions, said rotatable drum comprising an axle having (i) exterior portions, one exterior portion extending from an outside surface of each side portion, and (ii) a central portion having an opening that provides a path through an interior of the drum across a diameter of the drum. At 804, a portion of a retractable member is passed through the central portion of the axle. At 806, a pin is attached to the portion of the retractable member, and at 808, the pin and the portion of the retractable member are secured in the central portion by pulling on a second portion of the retractable member. The second portion of the retractable member is wound around the rotatable drum at 810.

Systems and methods as described herein may take a variety of forms. In one example, a fall limiting device includes a housing and a rotatable drum comprising an axle and two side portions, said rotatable drum comprising a single contiguous material piece. A retractable member is held, at least in part, within the housing via winding around the rotatable drum within the two side portions.

In an example, the axle comprises exterior portions, one exterior portion extending from an outside surface of each side portion, where the axle further includes a central portion having an opening that provides a path through an interior of the drum across a diameter of the drum. In another example, the device further includes a pin, where a portion of the retractable member is wrapped around the pin and affixed to itself, where the central portion of the axle is configured to retain the pin and the portion of the retractable member within the opening. In another example, the portion of the retractable member is affixed to itself via stitching, adhesive, or a retention clip or ring. In one example, the material piece comprises aluminum, where in the same or another example, the material is die cast. In one example, an outer surface of one of the side portions of the rotatable drum includes a structure for retaining an unwinding-speed limit control. In an example, the unwinding-speed limit control comprises a pawl. In a further example, the pawl is configured to pivot outwardly when the rotatable drum rotates at more than a threshold rate. In one embodiment, the housing includes a tooth, a protrusion, an indent, or a lip, where the pawl is configured to interact with the tooth, the protrusion, the indent, or the lip when pivoted outwardly. In one implementation, the structure for retaining the unwinding-speed limit control includes a first surface for interacting with a first end of a spring, where the unwinding-speed limit control includes a second surface for interacting with a second end of the spring. In one example, the spring is configured to retain the unwinding-speed limit control when the rotatable drum is rotating at less than a threshold rate. In examples, the device includes a retraction spring, wherein the retraction spring is configured to apply a winding force to the rotatable drum, where the device is configured to wind the retractable member when the retractable member is under a tension less than the winding force. In an example, the retractable member comprises a rope or a line, and in a further example, the retractable member comprises an energy absorber and a connection device. In one embodiment, the connection device is a hook or a carabineer. In an example, the device is a component of a personal fall limiter (PFL) or a self-retracting lanyard (SRL).

In another example, a method of assembling a device includes providing a rotatable drum comprising an axle and two side portions, said rotatable drum comprising an axle having (i) exterior portions, one exterior portion extending from an outside surface of each side portion, and (ii) a central portion having an opening that provides a path through an interior of the drum across a diameter of the drum. A portion of a retractable member is passed through the central portion of the axle. A pin is attached to the portion of the retractable member, the pin and the portion of the retractable member are secured in the central portion by pulling on a second portion of the retractable member, and the second portion of the retractable member is wound around the rotatable drum.

In one embodiment, the rotatable drum comprising a single contiguous material piece. In an example, the method further includes enclosing the rotatable drum within an enclosure, where the enclosure is configured to interact with the rotatable drum to halt rotation when the rotatable drum rotates at more than a threshold rate.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A fall limiting device, comprising:
- a housing configured to receive a rotatable drum;
- the rotatable drum comprising an axle and two side portions, said rotatable drum comprising a single contiguous material piece;
- a retractable member held, at least in part, within the housing via winding around the rotatable drum within the two side portions; and
- an unwinding-speed limit control located on an exterior surface of one of the side portions of the rotatable drum, wherein the unwinding-speed limit control is configured to engage with the housing and restrict payout of the retractable member from the housing upon the retractable member paying out at or above a predetermined threshold velocity.

2. The fall limiting device of claim 1, wherein the axle comprises exterior portions, one exterior portion extending from an outside surface of each side portion;
- wherein the axle further comprises a central portion having an opening that provides a path through an interior of the rotatable drum across a diameter or chord of the rotatable drum.

3. The fall limiting device of claim 2, further comprising a pin, wherein a portion of the retractable member is wrapped around the pin and affixed to itself, wherein the central portion of the axle is configured to retain the pin and the portion of the retractable member within the opening.

4. The fall limiting device of claim 3, wherein the portion of the retractable member is affixed to itself via stitching, adhesive, or a retention clip or ring.

5. The fall limiting device of claim 1, wherein the single contiguous material piece comprises aluminum.

6. The fall limiting device of claim 1, wherein the single contiguous material piece is die cast.

7. The fall limiting device of claim 1, wherein the unwinding-speed limit control comprises a pawl.

8. The fall limiting device of claim 7, wherein the pawl is configured to pivot outwardly and interact with a catch mechanism when the rotatable drum rotates at more than a threshold rate, wherein the catch mechanism comprises one or more teeth, protrusions, indents, or lips.

9. The fall limiting device of claim 8, wherein the housing comprises a tooth, a protrusion, an indent, or a lip, wherein the pawl is configured to interact with the tooth, the protrusion, the indent, or the lip when pivoted outwardly.

10. The fall limiting device of claim 1, wherein a structure for retaining the unwinding-speed limit control comprises a first surface for interacting with a first end of a spring;
- wherein the unwinding-speed limit control comprises a second surface for interacting with a second end of the spring.

11. The fall limiting device of claim 10, wherein the spring is configured to retain the unwinding-speed limit control in a stowed position when the rotatable drum is rotating at less than a threshold rate.

12. The fall limiting device of claim 1, further comprising a retraction spring, wherein the retraction spring is configured to apply a winding force to the rotatable drum, wherein the fall limiting device is configured to wind the retractable member when the retractable member is under a tension less than the winding force.

13. The fall limiting device of claim 1, wherein the retractable member comprises a rope or a line.

14. The fall limiting device of claim 1, wherein the retractable member comprises an energy absorber and a connection device.

15. The fall limiting device of claim 14, wherein the connection device is a hook or a carabineer.

16. The fall limiting device of claim 1, wherein the fall limiting device is a component of a personal fall limiter (PFL) or a self-retracting lanyard (SRL).

17. The fall limiting device of claim 1, further comprising one or more noise reducer pads positioned between the rotatable drum and the housing.

18. The fall limiting device of claim 1, wherein the housing comprises a catch mechanism disposed on an inner surface of the housing that is configured to engage with the unwinding-speed limit control when the rotatable drum rotates faster than a threshold rate.

19. The fall limiting device of claim 18, wherein the catch mechanism is a tooth, a protrusion, an indent, or a lip.

20. The fall limiting device of claim 1, wherein the exterior surface is a surface of one of the side portions of the rotatable drum farthest away from a central portion of the axle.

21. The fall limiting device of claim 1, wherein the exterior surface of the side portion that comprises the unwinding-speed limit control further comprises a protruding guiding structure configured to limit movement of the unwinding-speed limit control.

22. The fall limiting device of claim 2, wherein the opening is an hourglass opening comprising a first, second, and third cross section, wherein the second cross section is parallel to and in between the first and third cross sections, and wherein the second cross section is shorter than either the first or third cross section.

23. A method of assembling a fall limiting device, comprising:
- providing a rotatable drum comprising a single contiguous material piece; said rotatable drum further comprising an axle and two side portions, said rotatable drum further comprising the axle having (i) exterior portions, one exterior portion extending from an outside surface of each side portion, and (ii) a central portion having an opening that provides a path through an interior of the rotatable drum across a diameter of the rotatable drum;

passing a portion of a retractable member through the central portion of the axle;

attaching a pin to the portion of the retractable member;

securing the pin and the portion of the retractable member in the central portion by pulling on a second portion of the retractable member;

winding the second portion of the retractable member around the rotatable drum;

providing a housing to receive the rotatable drum, wherein an unwinding-speed limit control is located on an exterior surface of one of the side portions of the rotatable drum, and wherein the unwinding-speed limit control is configured to engage with the housing and restrict payout of the retractable member from the housing upon the retractable member paying out at or above a predetermined threshold velocity.

24. The method of claim 23, further comprising:

enclosing the rotatable drum within an enclosure, wherein the enclosure is configured to interact with the rotatable drum to halt rotation when the rotatable drum rotates at more than a threshold rate.

* * * * *